(12) United States Patent
Kumar et al.

(10) Patent No.: US 10,891,849 B1
(45) Date of Patent: Jan. 12, 2021

(54) SYSTEM FOR SUPPRESSING FALSE SERVICE OUTAGE ALERTS

(71) Applicant: Microsoft Technology Licensing, LLC, Redmond, WA (US)

(72) Inventors: Udayan Kumar, Kirkland, WA (US); Rakesh Jayadev Namineni, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 28 days.

(21) Appl. No.: 16/506,290

(22) Filed: Jul. 9, 2019

(51) Int. Cl.
| | |
|---|---|
| G08B 21/00 | (2006.01) |
| G08B 21/18 | (2006.01) |
| G06N 20/00 | (2019.01) |
| G06Q 10/10 | (2012.01) |

(52) U.S. Cl.
CPC ........... *G08B 21/185* (2013.01); *G06N 20/00* (2019.01); *G06Q 10/1095* (2013.01); *G08B 21/182* (2013.01)

(58) Field of Classification Search
CPC ............... G08B 21/185; G08B 21/182; G06Q 10/1095; G06Q 30/016; G06Q 10/0635; G06N 20/00; G06F 40/226; G06F 40/216; G06F 11/0793; G06F 11/0754; G06F 11/079; G06F 11/3006; G06F 11/0781; G06F 11/0709; G06F 11/3616; G06F 11/302; G06F 11/3414; G06F 11/3452; G06F 11/3409; G06F 11/3003; G06F 11/008; G06F 11/3051; G06F 11/1415; G06F 2201/81; G06F 2201/865; G06F 2201/88

USPC ......... 340/664, 506, 540, 309.16, 517, 500; 714/26
See application file for complete search history.

(56) References Cited

U.S. PATENT DOCUMENTS

| | | | |
|---|---|---|---|
| 6,966,015 | B2 | 11/2005 | Steinberg et al. |
| 7,730,172 | B1 | 6/2010 | Lewis |
| 8,190,939 | B2 | 5/2012 | Fields et al. |
| 8,972,783 | B2 | 3/2015 | Gupta et al. |
| 9,417,939 | B2 * | 8/2016 | Thiel ................... G06F 11/0793 |
| 9,984,060 | B2 * | 5/2018 | Bhattacharya ....... G08B 21/182 |
| 10,038,877 | B1 | 7/2018 | Faulkner et al. |
| 2012/0304007 | A1 | 11/2012 | Hanks et al. |
| 2013/0290438 | A1 | 10/2013 | Bank et al. |
| 2013/0329569 | A1 | 12/2013 | Russell et al. |

(Continued)

OTHER PUBLICATIONS

"Wikipedia:Bypass your cache—Wikipedia", Retrieved from: https://en.wikipedia.org/w/index.php?title=Wikipedia: Bypass_your_cache&oldid=904787668, Jul. 4, 2020, 9 Pages.

(Continued)

*Primary Examiner* — Anh V La

(74) *Attorney, Agent, or Firm* — Schwegman Lundberg & Woessner, P.A.

(57) ABSTRACT

A system may include a processing unit; a storage device comprising instructions, which when executed by the processing unit, configure the processing unit to perform operations comprising: receiving a service outage alert for a service used by an entity; retrieving a current count of non-recurring meetings for the entity; determining that the service outage alert is a false positive based on a current service load for the service and the current count; and based on the determining, suppressing the service outage alert.

20 Claims, 6 Drawing Sheets

(56) References Cited

U.S. PATENT DOCUMENTS

| | | | | |
|---|---|---|---|---|
| 2014/0136901 A1* | 5/2014 | Butler | ............... | G06F 11/302 |
| | | | | 714/38.1 |
| 2015/0254969 A1* | 9/2015 | Bishop | ............ | H04L 41/0622 |
| | | | | 340/506 |
| 2016/0198152 A1* | 7/2016 | Chin | ............. | H04N 21/2402 |
| | | | | 725/107 |

OTHER PUBLICATIONS

"International Search Report and Written Opinion Issued in PCT Application No. PCT/US2020/033011", dated Aug. 10, 2020, 10 Pages.

"Advanced Machine and Deep Learning Helps Digitization of IT", Retrieved from: https://www.cisco.com/c/en/us/solutions/collateral/enterprise/cisco-on-cisco/itb-bd-06292017-machine-and-deep-learning.html, May 22, 2019, 4 Pages.

Augustine, et al., "Outage Detection via Real-time Social Stream Analysis: Leveraging the Power of Online Complaints", In Proceedings of the 21st World Wide Web Conference, Apr. 16, 2012, pp. 13-22.

Balachandran, Arun, "Reduce False Alarms by Enabling Network Availability Check", Retrieved from: https://blogs.manageengine.com/application-performance-2/appmanager/2011/03/31/reduce-false-alarms-by-enabling-network-availability-check.html, Mar. 31, 2011, 3 Pages.

Oki, et al., "Mobile Network Failure Event Detection and Forecasting with Multiple User Activity Data Sets", In Proceedings the Thirtieth AAAI Conference on Innovative Applications of Artificial Intelligence, Feb. 4, 2018, pp, 7786-7792.

Richter, et al., "Advancing the Art of Internet Edge Outage Detection", In Proceedings of the Internet Measurement Conference, Oct. 31, 2018, 14 Pages.

"Load(Computing)", Retrieved From: https://en.wikipedia.org/w/index.php?t%20itle=Load%20(computing)&oldid=881338123, Retrieved On: Jul. 1, 2020, 5 Pages.

"International Search Report & Written Opinion issued in PCT Application No. PCT/US20/033335", dated Jul. 10, 2020, 10 Pages.

\* cited by examiner

SYSTEM FOR SUPPRESSING FALSE SERVICE OUTAGE ALERTS

BACKGROUND

An entity may use Software as a Service (SaaS) for a variety of applications such as e-mail, event planning, contact management etc. The company offering the service may monitor performance of the service. If the service appears to be performing suboptimally, an alert may be issued to the company and/or entity.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
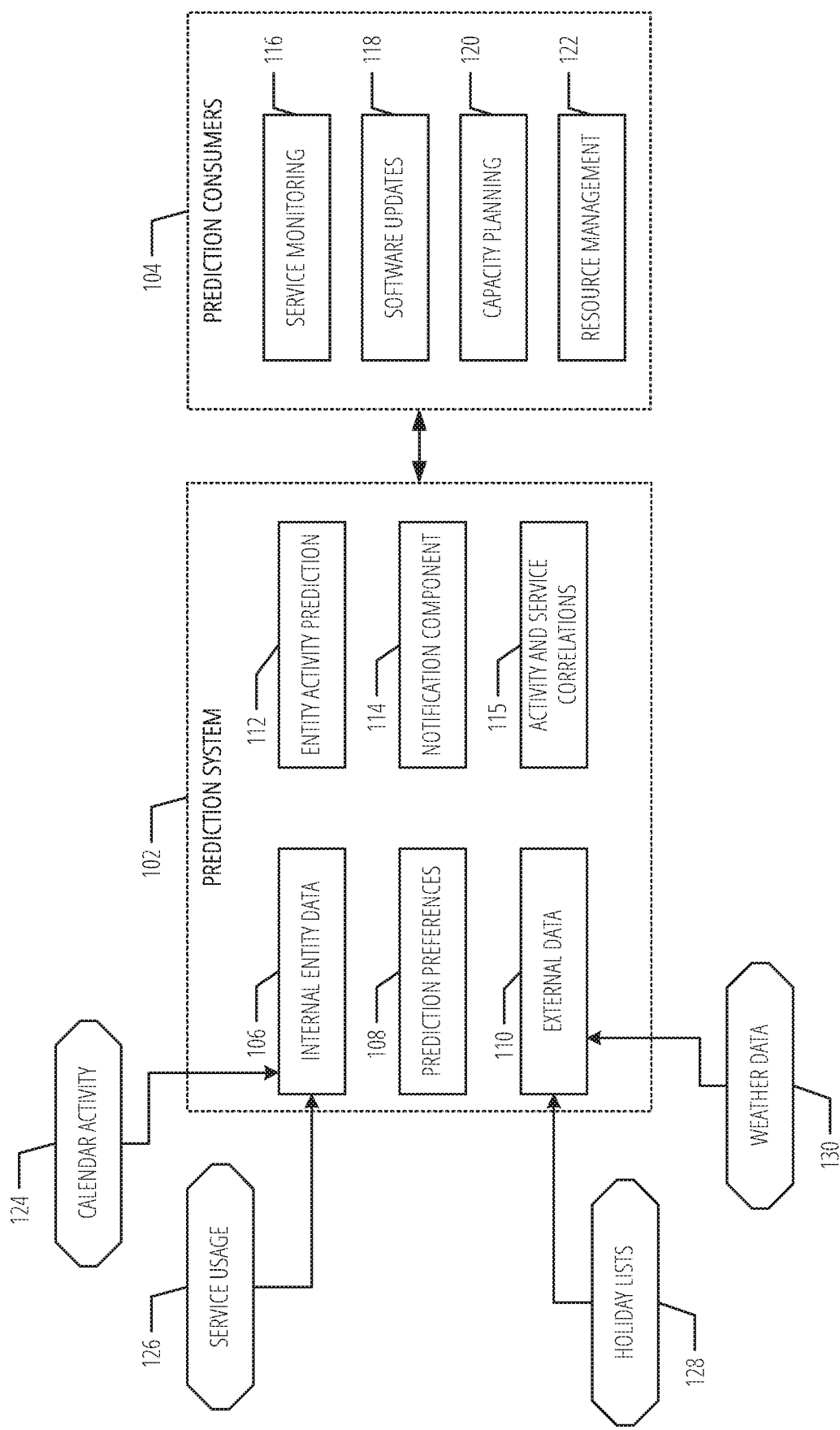
FIG. 1 is a diagram illustrating elements of a prediction system and prediction consumers, according to various examples.

In the following description, for purposes of explanation, numerous specific details are set forth in order to provide a thorough understanding of some examples. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device accessible by the component via an Application Programming Interface (API) or other program communication method. Similarly, the variables may be assumed to have default values should a specific value not be described. User interfaces may be provided for an end-user or administrator to edit the variable values in various examples.

One signal of a computing service (e.g., a website, login application, authentication application, e-mail services, file sync service, etc.) not performing properly is the usage of the service itself. Usage may be characterized as the number of active unique users/devices, in various examples. Additionally, it is common for a service to be provided to a number of entities (e.g., companies). To accommodate each entity, the service may be provided as part of a shared computing infrastructure (e.g., MICROSOFT AZURE®, AMAZON WEB SERVICES®, GOOGLE CLOUD PLATFORM™). Each entity may have a different usage level.

For example, if there are normally 100 users using a file sync service, but the current usage is only 20, there is a possibility the file sync service is not operating properly for an entity. Accordingly, a service outage alert may be issued, and an investigation may be performed to determine if the service is performing in a suboptimal manner. The investigation may require human resources as well as computing resources (e.g., running diagnostics, restarting computing systems, etc.).

Traditionally, to determine whether a current usage level is anomalous, trained machine learning models are used. For example, a machine learning model may be trained based on the historical usage and the time of day, the day of the week, holidays lists, etc. Accordingly, for a given day, time, and whether or not it is a holiday, the machine learning model may output a predicted usage level. If the current usage level is anomalous—e.g., is below some threshold percentage of the predicted level—the service alert may be issued. The use of such a machine learning model, however, leads to a number of false positives for a variety of reasons.

First, even if a holiday list is used, there no guarantee that entity usage level matches with the holiday list. For example, consider a company that is based in the United States but actually adheres to a Chinese holiday schedule. The machine learning model may output a service outage alert on the Chinese New Year because of a below normal usage rate.

Second, there are many events that are unpredictable and that a machine learning model—by the nature of how machine learning models are trained—would not be able to account for. For example, the machine learning model would not have an historical usage rate for unpredictable events such as natural disasters, international events, company events, etc. These unpredictable events would likely correspond to a low usage rate and result in a service outage alert even if the service is operating within its normal parameters.

A corollary of not being able to know what is considered "normal" usage for a given date is not being able to predict a future usage state. This may result in inefficient allocation of resources such that more computers than necessary are tasked to a service. Conversely, if the usage is higher than expected—based on existing machine learning models—performance of the service may suffer. Furthermore, by not knowing future usage a company may unnecessarily purchase extra equipment and need to provide maintenance of the equipment (cooling, software updates, hardware faults, etc.). With more accurate load (e.g., load) prediction, extra equipment can be turn off or allocated to other services.

One possible solution is to attempt to obtain entity-specific and geographic specific holiday calendar data. This approach, however, may rely on third-parties and there is no guarantee that the information provided is accurate. This approach also may not scale when there are millions of entities using a service. Furthermore, this approach still does not solve for the truly unpredictable events such as natural disasters.

Described herein is a system that utilizes internal entity data and external data to more accurately determine a baseline usage level as well as predict future usage levels for a service. The use of such a system may improve the performance of existing service outage detection systems by reducing the number of false positives. Furthermore, system resources may be more efficiently allocated thereby reducing the amount of processing power and memory needed for a given service if usage is predicted to be low.

Additionally, the approaches described herein may be used in multiple business arrangements. For example, they may be used within a business where the business own's the service and its data (e.g., meeting information of its own employees). The approaches may also be effective for business-to-business where the service is provided by a business (Service Provider) and will need the client business' (Service Consumer) data to accurately predict usage. In a business-to-consumer scenario typically the client is one consumer. In this case the data (meetings of a single attendee) is the aggregation of consumers' data specific to a geographical location, either based on IP or GPS, which could be used for better usage prediction.

One type of internal entity data is a count of non-recurring meetings (which may include appointments with a single attendee or meetings with multiple attendees) across the entity. For example, there is a high degree of correlation (e.g., >90%) between the number of non-recurring meetings and service usage level. Employees of an entity often know best when their company events are, which holidays they observe, if a snow storm has arrived, etc. Accordingly, the meeting count acts a proxy for unpredictable events. Thus, if a machine learning model outputs an indication that a service is out, the meeting count may suggest otherwise, and an outage alert may be suppressed. The term "meeting count" may not be limited to the nominal count, but may include an average count, a moving average, standard deviation, etc., to encompass an aggregated or wholistic view of the meetings. Additionally, although many of the examples described herein use non-recurring meetings count as the variable for determining current and predicted usage other variable types—including a total meeting count or other meeting type—may be used.

FIG. 1 is a diagram illustrating elements of a prediction system and prediction consumers, according to various examples. The diagram includes prediction system 102, prediction consumers 104, calendar activity 124, service usage 126, and holiday lists 128. Prediction system 102 is illustrated as including elements of internal entity data 106, prediction preferences 108, external data 110, entity activity prediction 112, notification component 114, and activity and service correlations 115. Prediction consumers 104 includes service monitoring 116, software updates 118, capacity planning 120, and resource management 122.

For illustration purposes, various elements in FIG. 1 are illustrated as a set of separate functional units (e.g., entity activity prediction 112, notification component 114, service monitoring 116, etc.). However, the functionality of multiple functional units may be performed by a single unit. A functional unit may represent computer program code that is executable by a processing unit (e.g., a core of a general-purpose computer processor, a graphical processing unit, an application specific integrated circuit, etc.). The program code may be stored on a storage device and loaded into a memory of the processing unit for execution. Portions of the program code may be executed in a parallel across multiple processing units. Execution of the code may be performed on a single device or distributed across multiple devices. In some example, the program code is executed on a cloud platform (e.g., MICROSOFT AZURE® and AMAZON EC2®) using shared computing infrastructure.

Similarly, the data used and stored by prediction system 102 and prediction consumers 104 may be organized and stored in a variety of manners. For convenience, the organized collection of data is often described in the context of a database(s) with tables (not illustrated in FIG. 1). The specific storage layout and model used in a database may take a number of forms'indeed, a database may utilize multiple models. The database may be, but is not limited to, a relational database (e.g., SQL), non-relational database (NoSQL) a flat file database, object model, document details model, graph database, shared ledger (e.g., blockchain), or a file system hierarchy. The database may store data on one or more storage devices (e.g., a hard disk, random access memory (RAM), etc.). The storage devices may be in standalone arrays, part of one or more servers, and may be located in one or more geographic areas. Each entity may have its own entity data (e.g., internal entity data 106) that is stored in one or more logical or geographic locations.

In various examples, elements in FIG. 1 may communicate via one or more networks (not illustrated). A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth, Wi-Fi Direct), or other combinations or permutations of network protocols and network types. A network may include a single local area network (LAN) or wide-area network (WAN), or combinations of LAN's or WAN's, such as the Internet Internal entity data 106 may be distinguished from external data 110 according to the logical location of the originating data store. For example, prediction system 102 may be provided by the same company that provides a service (e.g., e-mail) and hosts data for an entity. Accordingly, in an example, calendar activity 124 and service usage 126 are data sources under the same logical domain as prediction system 102 and thus are considered internal data. This arrangement ensures compliance with privacy and regulatory policies that may restrict communication of entity-specific data to third parties.

Internal entity data 106 may receive data from calendar activity 124 and service usage 126 for one or more entities. Calendar activity 124 and service usage 126 may be retrieved from the same or different systems. For example, calendar activity 124 may be stored in one data cluster and pushed to internal entity data 106, and service usage 126 may be accessed by prediction system 102 calling an API using an entity identifier.

Calendar activity 124 may include filtered or non-filtered calendar data. For example, non-filtered calendar activity 124 may be a dataset of all calendar entries for an entity for a given time period. The time period may be for a past time period, the current time (e.g., meetings currently happening), or a future time period. Calendar activity 124 may be metadata concerning the entire calendar set. For example, instead of sending a dataset of calendar entries, calendar activity 124 may be the total number of calendar entries (subject to any filters) for a given time period.

A calendar entry may include a duration, the number of attendees, whether or not the meeting reoccurs (e.g., a standing meeting every Monday at 9:00 AM), and a type of meeting (e.g., a video meeting, a screen sharing meeting, etc.). A filtered dataset may exclude meetings based on criterion such as meetings that have been marked confidential, meetings with only a single attendee, whether or not the meeting reoccurs, duration, whether or not a meeting is a video meeting. The type of meeting may also be used to predict a more granular service load. For example, predicting a service load for services that support a particular type of meeting, such as video calls.

Prediction system 102 may periodically (e.g., every 15 minutes) request updated calendar activity 124 for storage within prediction system 102 for an entity. In various examples, prediction system 102 may request calendar activity 124 on-demand such as when service monitoring 116 indicates a service may be down. In various examples, calendar activity 124 is pushed to prediction system 102 periodically.

Service usage 126 may identify current or past usage for a service. Usage may be measured according to a stored rule and may be different for different services or entities. For example, usage may be the total number of unique users logged in to a service, the total number of unique users that have been logged in to the service in the past fifteen minutes, the number of devices with an active connection to the service, memory usage, etc.

As an example, consider that the service is an e-mail service (e.g., provided by a MICROSOFT EXCHANGE SERVER®). Usage may be determined by querying the service (e.g., using an API) to obtain the current number of unique user identifiers for an entity that have requested mail in the past five minutes.

In various examples, received service usage 126 and calendar activity 124 may identify different levels of granularity based on region/geographic area. For example, there may be 50 devices using a service in Minnesota and 300 in Washington. Similarly, there may be 15 non-recurring calendar events in Minnesota and 45 in Washington.

In various examples, received service usage 126 and calendar activity 124 may identify usage by data center. For example, it is common for a service to be hosted/implemented on multiple data centers. When a user connects to the service the user is generally assigned a data center that is closest to them in order to provide the user a fast connection. In such a manner, service usage 126 may be mined to determine if a specific data center is experiencing low usage—and is therefore not operating properly.

External data 110 may receive entity-agnostic or entity-specific data, but the originating data source may be external (logically) from prediction system 102. For example, prediction system 102 may request (e.g., via an API call) holiday lists 128 for an entity or a geographic region. The holiday list may include geographic variants for a single entity. A holiday list may identify the days an entity or geographic region generally does not work. A received holiday list may be associated with an entity by prediction system 102 if the holiday list is entity-agnostic (e.g., based on the geographic region of the entity and geographic region associated with the holiday list).

Weather data 130 may identify the weather conditions (e.g., temperature, whether it is raining, etc.) for a given geographic area such as by zip code or address. The weather conditions may identify any active weather warnings (e.g., blizzard warning) for the area. Prediction system 102 may request weather data 130 on-demand. In various examples, weather data 130 includes forecasted conditions for the area. In various examples, weather data 130 may include historical weather for an area.

Other types of external data 110 may be received by prediction system 102 such as, but not limited to, natural disasters, political events, wars, etc.

Prediction preferences 108 may store preferences for use by entity activity prediction 112. For example, prediction preferences 108 may identify how often to refresh internal entity data 106 and external data 110. Prediction preferences 108 may also identify what data to use in determining a usage level for a service and what how to determine an expected service usage level (discussed in more detail with respect to entity activity prediction 112).

Prediction preferences 108 may identify the filtering criteria for calendar activity 124. For example, the preference may indicate to exclude meetings that reoccur, have a duration less than 30 minutes, have a duration more than eight hours, and have more than 20 attendees. In another example, the preference may indicate to include all meetings regardless of reoccurrence that are of a video type. This may be used to predict a service load on resources that support video calls.

Activity and service correlations 115 may store (e.g., in a database table) the relationships between aspects of internal entity data 106 and/or external data 110. Activity and service correlations 115 may be entity-specific or entity-agnostic. For example, activity and service correlations 115 may have an entry with the following fields: {timestamp}, {entity identifier}, {current count of non-recurring meetings}, {service identifier}, {current usage level}. The entry may be added when prediction system 102 receives calendar activity 124 and service usage 126.

Activity and service correlations 115 may store summary entries. A summary entry may identify the average usage level for a given count of non-recurring meetings. Other statistical measures may be stored such as standard deviation, minimum usage level for a given count, and maximum usage level for a given count.

Entity activity prediction 112 may be used to output an expected usage level given a count of non-recurring meetings. Entity activity prediction 112 may be implemented in a variety of manners. For example, entity activity prediction 112 may use a lookup table (e.g., activity and service correlations 115) to find the average usage level for a given count. Entity activity prediction 112 may use a trained machine learning model in some examples. The machine learning model may be entity and service specific in various examples.

The machine learning model may be trained using data collected by prediction system 102 such as internal entity data 106 and external data 110. For example, a feature vector for use in a neural network may include the count of non-recurring meetings and weather conditions. The expected output for the feature vector may be the usage level. An encoding scheme (e.g., one hot encoding) may be used for the weather conditions. Similarly, the usage levels may be grouped from what may be deemed low to high usage. For example, between 0-100 unique users may be low usage, 101-200 medium usage, and over 200 high. These levels may also be one hot encoded in an output vector (e.g., a three-element array in this example). Accordingly, a feature vector may be [520, 00, 1, 0] if there are 520 meeting and there is a blizzard assuming the fourth position in the vector represents the blizzard condition. The training output vector may be [1, 0, 0] indicating a low usage rate.

Notification component 114 may be used to transmit a message to users or computing systems based on the output of entity activity prediction 112. Notification component 114 may also be used to suppress messages from other systems. For example, service monitoring 116 may issue an outage alert indicating a service is down for an entity. The alert may normally be sent to a contact at the entity to inform them that there is a potential issue with the service based on a low usage rate. Entity activity prediction 112, however, may determine that the low usage is within an expected range based on the count of non-recurring meetings. Accordingly, notification component 114 may override service monitoring 116 and stop the outage alert from being sent to the contact.

In various examples, notification component 114 may periodically (e.g., every 5 minutes) transmit the expected usage to service monitoring 116. In such an example, service monitoring 116 may suppress the alert to the contact when any observed low usage is within an expected range based on the count of non-recurring meetings.

Notification component 114 may also transmit messages to computing systems with instructions to allocate or deallocate resources based on predicted future service usage. For example, a message may be sent (e.g., via an API) to capacity planning 120 that the following Monday low service usage is expected and to decrease resources allocated to providing the service.

Prediction consumers 104 may be configured or interact with prediction system 102. For example, service monitoring 116 may be an existing service monitoring process that attempts to determine whether or not there is a problem with a service. Service monitoring 116 may use one or more machine learning models that have been trained using historical data. A current set of conditions (e.g., time of day, day of the week, etc.) and current usage level may be input into one of the machine learning models. The output may be a percentage chance that the service is down.

Software updates 118 may be one or more systems that determine when to push updates out. Software updates 118 may use the predicted usage level of a service to schedule an update so as to minimize the impact on end-users by scheduling the update when service is expected to be low.

Capacity planning 120 and resource management 122 may be used to allocate more (or deallocate) computing servers for a service. For example, capacity planning 120 may determine, based on an expected usage level, how many computing servers to assign to a service.

Resource management 122 may be used to ensure that an unnecessary load is not incurred if a predicted usage level is known ahead of time. For example, caches, tokens, often have a timer (e.g., time-to-live) that causes them to expire. If there is a low usage rate (over a holiday for example) many of the caches/tokens may expire. Then, when the holiday is over and everyone starts logging in to the service, there may be a surge of computing resources needed to reinitialize the tokens or caches. This may result in degraded performance until the surge has passed. Resource management 122 may use the knowledge—according to entity activity prediction 112—when the surge is likely to occur and preemptively refresh the tokens and caches in various examples.

Figure 2:
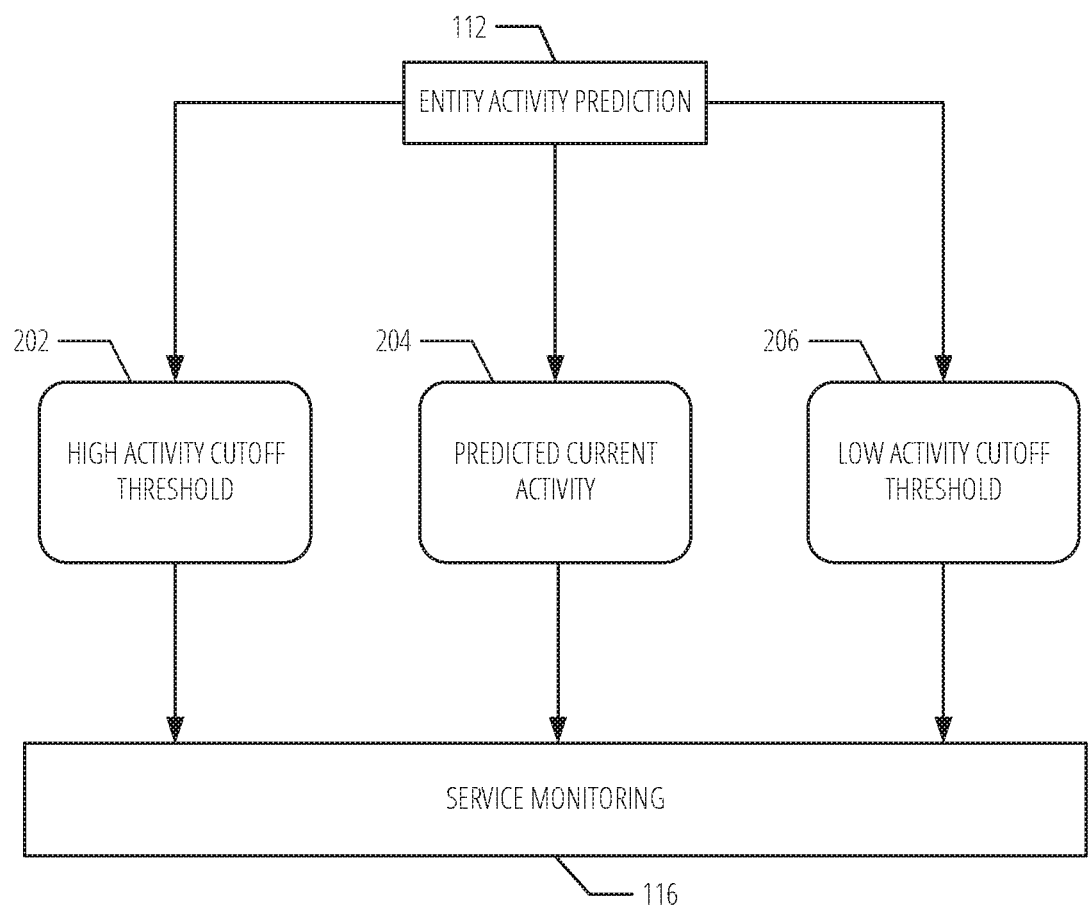
FIG. 2 is a diagram illustrating cutoff thresholds for activity levels, according to various examples.

FIG. 2 is a diagram illustrating cutoff thresholds for activity levels, according to various examples. The diagram includes entity activity prediction 112 communicating with service monitoring 116 concerning high activity cutoff threshold 202, predicted current activity 204, and low activity cutoff threshold 206.

Entity activity prediction 112 may transmit high activity cutoff threshold 202, predicted current activity 204, and low activity cutoff threshold 206 upon a request from service monitoring 116 in various examples. The request may include a service and entity identifier. Predicted current activity 204 may be based on querying activity and service correlations 115 with the current count of non-recurring meetings for the entity.

High activity cutoff threshold 202 and low activity cutoff threshold 206 may be based on retrieving the historical range of usage levels for the service given a count of non-recurring meetings. For example, high activity cutoff threshold 202 may be the highest usage level observed for the service given the count and low activity cutoff threshold 206 may be the lowest observed usage. Other statistical measures may be used instead of the absolute range. For example, low activity cutoff threshold 206 may be set as two standard deviations away from median usage level. The type of measure to use may be stored as part of prediction preferences 108.

Entity activity prediction 112 may use the weather conditions to alter the thresholds for activity. For example, if a blizzard is happening and the entity cancels work for the day it is likely that many of the calendar meetings would not be removed—because everyone knows work has been canceled. Accordingly, service monitoring 116 may believe the service is down based on low usage and request high activity cutoff threshold 202, predicted current activity 204, and low activity cutoff threshold 206 from entity activity prediction 112. Without the weather information, low activity cutoff threshold 206 may not be low enough, and the outage alert may get passed on to a contact at the entity as well as initiate resources to troubleshoot the believed down service.

Entity activity prediction 112, however, may lower low activity cutoff threshold 206 based on the fact that a blizzard is occurring. For example, low activity cutoff threshold 206 may be set at 35% of what low activity cutoff threshold 206 would be without the knowledge of the blizzard. The weighting for each weather condition may be stored as part of prediction preferences 108. Adjustment may be made in a similar manger based on holiday lists 128.

Figure 3:
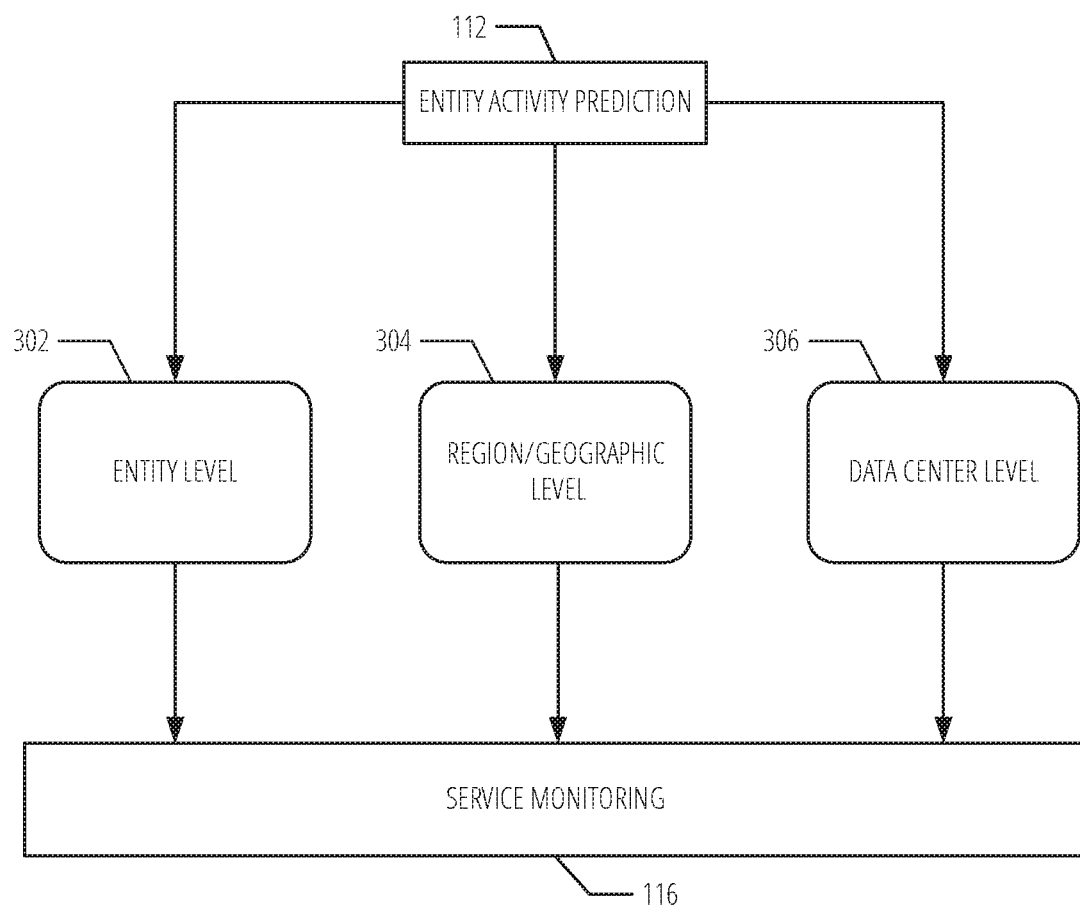
FIG. 3 is a diagram illustrating calculating multiple usage levels, according to various examples.

FIG. 3 is a diagram illustrating calculating multiple usage levels, according to various examples. The diagram includes entity activity prediction 112 calculating three (potentially different) service activity levels: entity level 302, region/geographic level 304, and data center level 306. The different levels may be transmitted to service monitoring 116 for use in determining whether or not a service is out. Entity level 302 may be the usage level for a service across all users of an entity. The process for determining the usage level for an entity may be as described in FIG. 2.

Region/geographic level 304 may be a predicted or current usage level for a particular region. A region/geographic area may be defined by a zip code, city, state, country, etc. The region may include multiple entities in some examples. An entity may have users in multiple regions. Thus, the current/predicted usage for a region may only account for a portion of the total entity's users.

As discussed previously, internal entity data 106 may include geographic information. Accordingly, activity and service correlations 115 may be queried for a specific geographic region and calculate or retrieve a current predicted usage level for a particular region (e.g., Washington State). The predicted usage level may include high and low-cutoff threshold values determined in a similar manner as discussed in FIG. 2.

Using a region/geographic level 304 may provide an even more accurate outage prediction compared to at the entity level. For example, consider an entity that has two main geographic regions (e.g., United States and China). If one of the regions is observing a local holiday it may bring the overall service level down to the point that service monitoring 116 issues an outage alert. If service monitoring 116 requests an expected service level for the entity in the two main regions, however, service monitoring 116 may determine that the service is not down. Conversely, region/geographic level 304 may be used to determine that a service is down in a particular region even though the overall usage level appears within a normal range.

Region/geographic level 304 may also be used to find potential service problems across a number of entities. For example, service monitoring 116 may request predicted usage levels for multiple entities in a specific region. Service monitoring 116 may request an aggregate level and entity-specific levels. Even if, in aggregate, the entities are within the thresholds provided by entity activity prediction 112, a potential outage alert may be issued if more than 25% of the entities are below the low activity cutoff threshold.

Data center level 306 may be calculated in a similar manner as region/geographic level 304 but at the data center level. For example, activity and service correlations 115 may be queried for a specific data center and calculate (or retrieve) a current predicted usage level for a data center. The predicted usage level may include high and low-cutoff threshold values determined in a similar manner as discussed in FIG. 2.

As with region/geographic level 304, data center level 306 usage levels may include values for multiple entities as well only a partial value for a particular entity. Data center level 306 may be used by service monitoring 116 to see if a particular data center that is implementing a service is not performing within an expected range.

Figure 4:
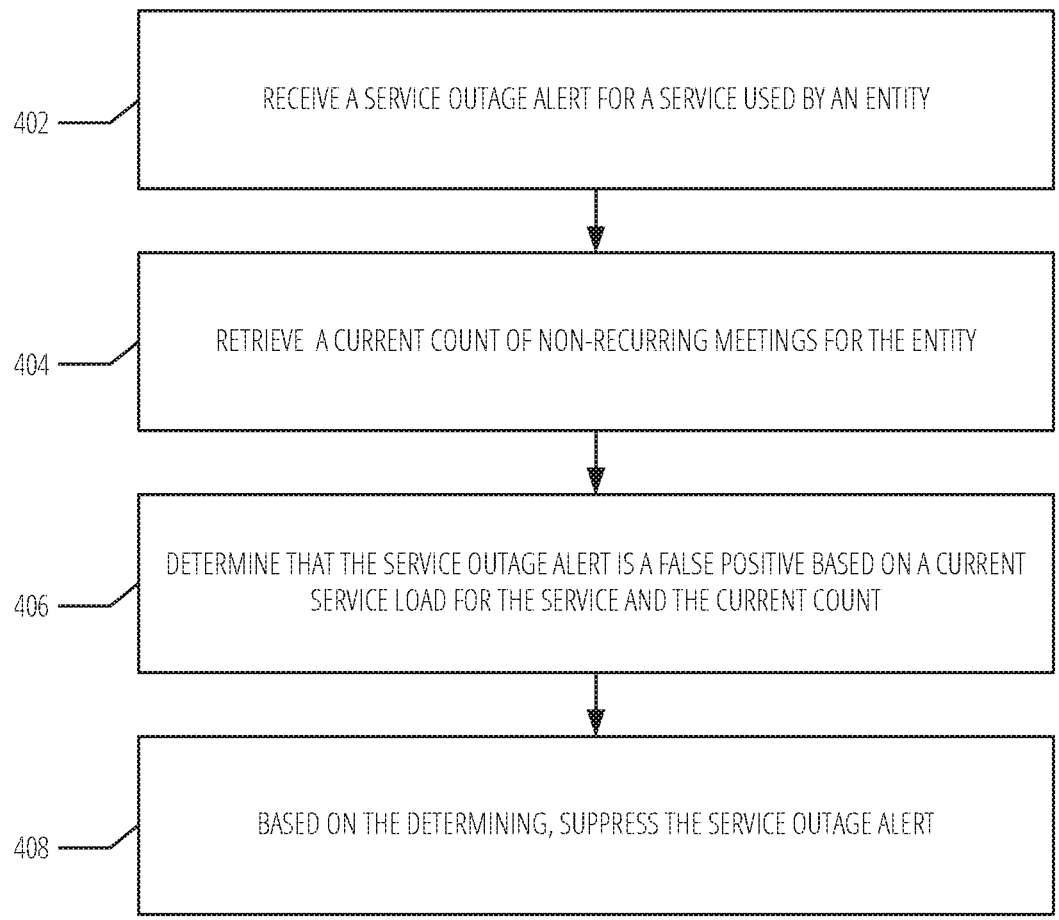
FIG. 4 is a flowchart illustrating operations in a method to suppress a service outage alert, according to various examples.

FIG. 4 is a flowchart illustrating operations in a method to suppress a service outage alert, according to various examples. The method is represented as a set of blocks that describe operations 402-408 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 4. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

Operation 402, in various examples, includes receiving a service outage alert for a service used by an entity. The service outage alert may be received by a system such as prediction system 102 from service monitoring 116. The service outage alert may identify a particular entity, geographic region, and/or a data center. The service outage alert may have been the result of detected low usage by service monitoring 116. Low usage (e.g., a current service load) may be based on the number of computing devices logged into the service for the entity.

Operation 404, in various examples, includes retrieving a current count of non-recurring meetings for the entity. In various example, retrieving may include querying a calendar datastore (e.g., calendar activity 124) for a complete meeting count for the entity. The count may be filtered to remove meeting that only have a single attendee or reoccur. Additional filtering options may include excluding meeting that are above or below a certain duration threshold. If a geographic or data center was identified in the alert, the count may be limited to the specific geographic area or data center.

Operation 406, in various examples, includes determining that the service outage alert is a false positive (e.g., the service is not actually down) based on a current service load for the service and the current count. For example, the current count of non-recurring meetings may be input into a trained machine learning model. The machine learning model may out an expected service load for the current count. The output may be a percentage chance a series of service load ranges (e.g., an 82% the load is between 100-500 users, 15% the load is between 501-1000, and 3% the load is over 1000). The machine learning model may have been configured based on historical service loads for the service and counts of non-recurring meetings for the entity (e.g., as stored in activity and service correlations 115).

In an example, wherein determining that the service outage alert is a false positive includes retrieving an expected service load for the service based on the current count. For example, a lookup table (e.g., activity and service correlations 115) may be used to determine the expected service load (e.g., an average usage based on the count). The lookup may also include a low activity cutoff threshold (e.g., as described in FIG. 2), In various examples, the expected service load (or cutoff) may be compared to the current service load for the entity.

Operation 408, in various examples, includes based on the determining in operation 406, suppressing the service outage alert. For example, if the current service load is within a certain range of the average service load or the expected output based on the machine learning model, the service outage alert may suppress. Suppressing may include changing the status of the alert to a false positive thereby preventing a notification from being sent to a contact or other computing systems.

Figure 5:
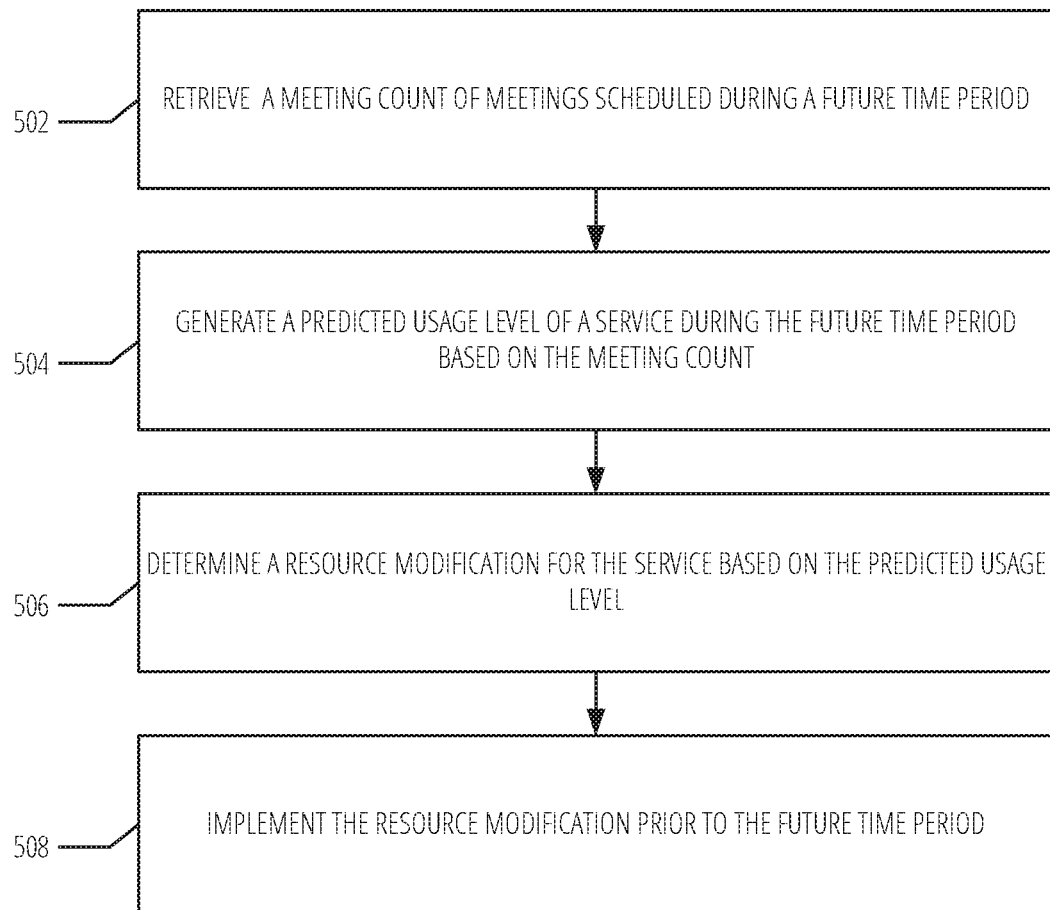
FIG. 5 is a flowchart illustrating operations in a method to implement a resource modification according to a predicted service level, according to various examples.

FIG. 5 is a flowchart illustrating operations in a method to implement a resource modification according to a predicted service level, according to various examples. The method is represented as a set of blocks that describe operations 502-508 of the method. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 5. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

Operation 502, in various examples, includes retrieving a meeting count of meetings scheduled during a future time period. In various examples, operation 502 may be performed in response to receiving a request for a predicted usage level for a future period of time. The request may be for a specific service, geographic area, or data center. The retrieved meeting count may be for the specified service, geographic area, or data center at the future time period.

For example, if the request was for Washington State, operation 502 may retrieve the meeting count of meetings scheduled by users of the service in Washington state. The meeting count may be specific to an entity or an aggregation across multiple entities. In various example, the meeting count excludes recurring meetings.

Operation 504, in various examples, includes generating a predicted usage level of a service during the future time period based on the meeting count. For example, a query may be made to a datastore such as activity and service correlations 115 using the count from operation 502 as an input. The output may be one or more values (e.g., low threshold, average usage level, and high threshold) for the service. Thus, the predicted usage level may be based on historical usage levels for the service correlated with the count. The predicted usage level may include an expected number of unique devices connected to the service during the future time period Operation 506, in various examples, includes determining a resource modification for the service based on the predicted usage level. The resource modification may be based on stored tables indicating the amount of processing power needed to support a given usage level. Accordingly, a resource modification may be an increase or decrease in computing resources allocated to the service when the current allocation is too low to support the predicted future level. In an example, a resource modification may be to refresh caches on systems that support the service or updating tokens that have may expire before the future time period.

Operation 508 in various examples, includes implementing the resource modification prior to the future time period. Implementing may include transmitting an instruction to a server such as capacity planning 120 and resource management 122 with the predicted usage level.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 6:
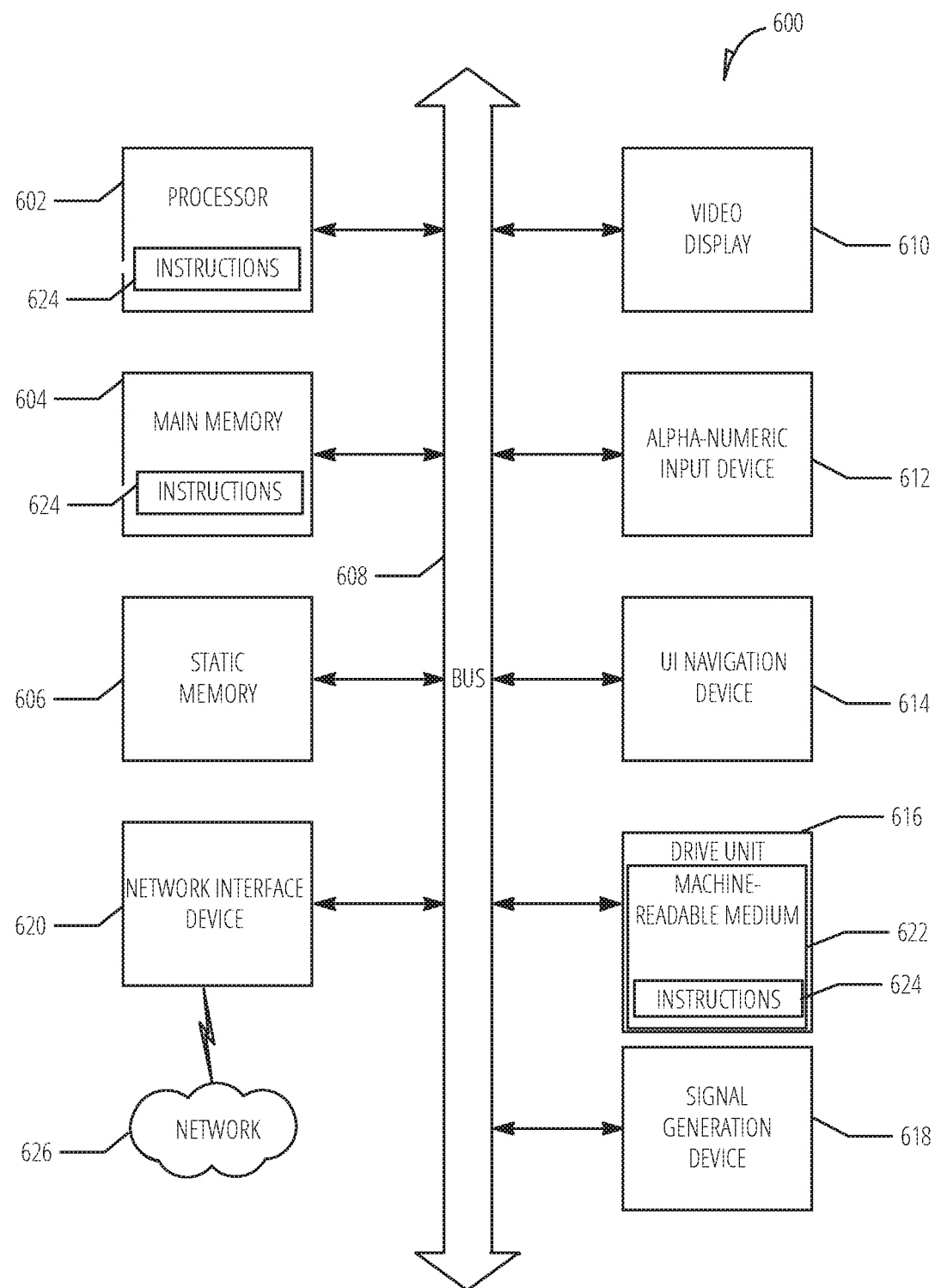
FIG. 6 is a block diagram illustrating an example machine upon which any one or more of the techniques (e.g., methodologies) discussed herein may be performed, according to an example embodiment.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A system comprising:
    a processing unit:
    a storage device comprising instructions, which when executed by the processing unit, configure the processing unit to perform operations comprising:
        receiving a service outage alert for a service used by an entity;
        retrieving a current count of non-recurring meetings for the entity:
        determining that the service outage alert is a false positive based on a current service load for the service and the current count; and
        based on the determining, suppressing the service outage alert.
2. The system of claim 1, wherein retrieving the current count of non-recurring meetings for the entity comprises:
    querying a calendar datastore for a complete meeting count for the entity:
    filtering out meetings from the complete meeting count having only a single attendee; and
    filtering out recurring meetings from the complete meeting count.
3. The system of claim 2, wherein retrieving the current count of non-recurring meetings for the entity further comprises:
    filtering out meetings from the complete meeting count having a duration above a threshold.
4. The system of claim 1, wherein determining that the service outage alert is a false positive based on a current service load and the current count comprises:
    inputting the current count into a trained machine learning model; and
    receiving an output from the trained machine learning model indicating an expected service load for the current count.
5. The system of claim 4, wherein the trained machine learning model is configured based on historical service loads for the service and counts of non-recurring meetings for the entity.
6. The system of claim 1, wherein determining that the service outage alert is a false positive based on a current service load and the current count comprises:
    retrieving an expected service load for the service based on the current count; and
    comparing, the expected service load to the current service load for the entity.
7. The system of 6, wherein comparing, the expected service load to the current service load for the entity includes comparing the current service load to a low activity cutoff threshold.
8. The system of claim 1, wherein the service outage alert for the service used by the entity identifies a geographic region of a plurality of geographic regions where the service operates; and wherein retrieving the current count of non-recurring meetings for the entity includes retrieving the current count of non-recurring meetings for the entity in the geographic region.
9. The system of claim 1, wherein the current service load is based on the number of computing devices logged into the service for the entity.
10. A method comprising:
    receiving a service outage alert for a service used by an entity:
    retrieving a current count of non-recurring meetings for the entity;
    determining that the service outage alert is a false positive based on a current service load for the service and the current count; and
    based on the determining, suppressing the service outage alert.
11. The method of claim 10, wherein retrieving the current count of non-recurring meetings for the entity comprises:
    querying a calendar datastore for a complete meeting count for the entity;
    filtering out meetings from the complete meeting count having only a single attendee; and
    filtering out recurring meetings from the complete meeting count.
12. The method of claim 11, wherein retrieving the current count of non-recurring meetings for the entity further comprises:
    filtering out meetings from the complete meeting count having a duration above a threshold.

13. The method of claim 10, wherein determining that the service outage alert is a false positive based on a current service load and the current count comprises:
- inputting the current count into a trained machine learning model; and
- receiving an output from the trained machine learning model indicating an expected service load for the current count.

14. The method of claim 13, wherein the trained machine learning model is configured based on historical service loads for the service and counts of non-recurring meetings for the entity.

15. The method of claim 10, wherein determining that the service outage alert is a false positive based on a current service load and the current count comprises:
- retrieving an expected service load for the service based on the current count; and
- comparing, the expected service load to the current service load for the entity.

16. The method of 15, wherein comparing, the expected service load to the current service load for the entity includes comparing the current service load to a low activity cutoff threshold.

17. The method of claim 10, wherein the service outage alert for the service used by the entity identifies a geographic region of a plurality of geographic regions where the service operates; and wherein retrieving the current count of non-recurring meetings for the entity includes retrieving the current count of non-recurring meetings for the entity in the geographic region.

18. The method of claim 10, wherein the current service load is based on the number of computing devices logged into the service for the entity.

19. A storage device comprising instructions, which when executed by at least one processor, configure the at least one processor to perform operations including:
- receiving a service outage alert for a service used by an entity;
- retrieving a current count of non-recurring meetings for the entity;
- determining that the service outage alert is a false positive based on a current service load for the service and the current count; and
- based on the determining, suppressing the service outage alert.

20. The storage device of claim 19, where retrieving the current count of non-recurring meetings for the entity comprises:
- querying a calendar datastore for a complete meeting count for the entity;
- filtering out meetings from the complete meeting count having only a single attendee; and
- filtering out recurring meetings from the complete meeting count.

* * * * *